United States Patent
Miao et al.

(10) Patent No.: US 7,794,684 B2
(45) Date of Patent: Sep. 14, 2010

(54) METHODS FOR PRODUCING CARBON NANOSTRUCTURES

(75) Inventors: Jianying Miao, Hong Kong (CN); Ning Wang, Hong Kong (CN); Ping Sheng, Hong Kong (CN)

(73) Assignee: The Hong Kong University of Science and Technology, Kowloon (HK)

( * ) Notice: Subject to any disclaimer, the term of this patent is extended or adjusted under 35 U.S.C. 154(b) by 802 days.

(21) Appl. No.: 11/471,425

(22) Filed: Jun. 20, 2006

(65) Prior Publication Data

US 2010/0080994 A1 Apr. 1, 2010

Related U.S. Application Data

(60) Provisional application No. 60/691,987, filed on Jun. 20, 2005.

(51) Int. Cl.
*D01F 9/12* (2006.01)
(52) U.S. Cl. .............. 423/447.1; 423/447.3; 423/447.7; 977/842
(58) Field of Classification Search .............. 423/447.1, 423/447.2, 447.3; 977/842–848
See application file for complete search history.

(56) References Cited

OTHER PUBLICATIONS

Yuan, et al., Field emission property of highly ordered monodispersed carbon nanotube arrays, Applied Physics Letters 2001; 78(20): 3127-3129.*
Cho, et al., Synthesis of carbon nanotubes from bulk polymer, Appl. Phys. Lett. 1996; 69(2): 278-279.*
Miao, et al., Structural Characterization of Carbon Nanotube Arrays Formed in Ultra-Long Nanochannels of Porous Alumina Templates, Microscopy and Microanalysis 2005; 11(Suppl. 2): 1414-1415.*
Cambridge Jouranls Website for Miao, et al., Structural Characterization of Carbon Nanotube Arrays Formed in Ultra-Long Nanochannels of Porous Alumina Templates, Microscopy and Microanalysis 2005; 11(Suppl. 2): 1414-1415.*
Botti, et al., Self-assembled carbon nanotubes grown without catalyst from nanosized carbon particles adsorbed on silicon, Applied Physics Letters 2002; 80(8): 1441-1443.*
Suh, et al., Highly ordered two-dimensional carbon arrays, Applied Physics Letters 1999; 75(14): 2047-2049.*
Parthasarathy, et al., Template Synthesis of Graphitic Nanotubes, Office of Naval Research, Technical Report No. 103.*
Martin, Nanomaterials: A Membrane-Based Synthetic Approach, Science 1994; 266: 1961-1966.*
Fan SS, Chapline MG, Franklin NR, Tombler TW, Cassell AM, Dai HJ. Self-oriented regular arrays of carbon nanotubes and their field emission properties. Science 1998;283 (5401): 512-514.
Li WZ, Xie SS, Qian LX, Chang BH, Zou BS, Zhou WY, Zhao RA, Wang G. Large-scale synthesis of aligned carbon nanotubes. Science 1996; 274 (5293): 1701-1703.
Ren ZF, Huang ZP, Xu JW, Wang JH, Bush P, Siegal MP, Provencio PN. Synthesis of large arrays of well-aligned carbon nanotubes on glass. Science 1998; 282 (5391): 1105-1107.

(Continued)

*Primary Examiner*—Stanley S. Silverman
*Assistant Examiner*—Daniel C. McCracken
(74) *Attorney, Agent, or Firm*—Heslin Rothenberg Farley & Mesiti PC

(57) ABSTRACT

Methods of producing carbon nanostructures utilizing a polymer and a nanostructure template to form carbon nanostructures are disclosed. The method does not require a metal catalyst.

10 Claims, 6 Drawing Sheets

OTHER PUBLICATIONS

Martin CR. Nanomaterials—a membrane-based synthetic approach. Science 1994; 266 (5193): 1961-1966.

Kyotani T, Tsai LF, Tomita A. Formation of ultrafine carbon tubes by using an anodic Aluminum-oxide film as a template. Chem Mater 1995; 7 (8):1427-1428.

Parthasarathy RV, Phani KLN, Martin CR. Template synthesis of graphitic nanotubes Adv Mater 1995; 7 (11): 896-897.

Suh JS, Lee JS. Highly ordered two-dimensional carbon nanotube arrays. Appl Phys Lett 1999; 75 (14):2047-2049.

Li J, Papadopoulos C, Xu JM, Moskovits M. Highly-ordered carbon nanotube arrays for electronics applications, Appl Phys Lett 1999; 75 (3): 367-369.

Kyotani T, Pradhan BK, Tomita A. Synthesis of carbon nanotube composites in nanochannels of an anodic aluminium oxide film. Bulletin Chem. Soc. Jpn. 1999; 72 (9):1957-1970.

Yao BD, Wang N. Carbon nanotube arrays prepared by MWCVD. J Phys Chem 2001; B105 (46): 11395-11398.

Jeong SH, Lee KH. Field emission properties of short crystalline carbon nanotubes cut by sonication on substrate. Japanese Journal of Applied Physics Part2- Letters & Express Letters 2004;43 (88): L1106-L1108.

Rick C Schroden, Mohammed Al-Daous, Christopher F Blanford, Andreas Stein, Optical properties of inverse opal photonic crystals, Chem Mater 2002; 14: 3305-3315.

Holland BT, Blanford CF, Stein A. Science 1998; 281:538-540.

Velev OD, Tessier PM, Lenhoff AM, Kaler EW. Nature 1999; 401: 548.

Vlasov YA, Bo XZ, Sturm JC, Norris DJ. Nature 2001 414:289-293.

Jiang P, Hwang KS, Mittleman DM, Bertone JF, Colvin VL. J Am Chem Soc 1999; 121: 11630-11637.

Anvar A Zakhidov, Ray H Baughman, Zafar Iqbal, Changxing Cui, Ilyas Khayrullin, Socrates O Dantas, Jordi Marti, Victor G Ralchenko, Carbon structures with three-dimensional periodicity at optical wavelengths. Science 1998; 282: 897-901.

Holland BT, Blanford CF, Do T, Stein A. Chem Mater 1999; 11: 795-805.

* cited by examiner

METHODS FOR PRODUCING CARBON NANOSTRUCTURES

CROSS-REFERENCE TO RELATED APPLICATIONS

This application claims priority from U.S. Provisional Application Ser. No. 60/691,987, filed Jun. 20, 2005, the entire contents of which are incorporated herein by reference.

FIELD OF THE INVENTION

The present invention describes methods of producing carbon nanostructures. Specifically the described methods utilize a polymer and a nanostructure template to form carbon nanostructures, but do not require a metal catalyst.

BACKGROUND

Carbon nanotubes (CNTs) are cylindrical carbon molecules with unusual properties that make them useful in a wide variety of applications. CNTs have been used in electronics, optics, and nanotechnology, as well as other fields of material science. They exhibit unusually high strength as well as excellent electrical properties, and are also heat conductors.

The diameter of a typical nanotube is a few nanometers (approximately 50,000 times smaller than the width of a human hair), and they are generally much longer than they are wide.

There are numerous methods of producing carbon nanostructures. The most commonly used methods include arc discharge and chemical vapor deposition (CVD). While other methods are known, the cost of manufacturing carbon nanostructures is still disproportionately high. Most known methods require a metal catalyst to produce the carbon nanostructures, and this requirement involves more complicated production processes. Metal catalysts may also contaminate the carbon nanostructures that are produced. Furthermore, current carbon nanostructure manufacturing processes require temperatures in excess of 600 degrees Celsius, and this leads to increased manufacturing costs. Although methods known in the art are capable of producing large quantities of nanotubes, the high costs involved preclude large-scale manufacturing.

It is an object of the present invention to provide improved or alternative processes for manufacturing carbon nanostructures.

SUMMARY OF THE INVENTION

In a first aspect, the invention broadly describes a method of producing a carbon nanostructure comprising the following steps:
Placing a nanochannel template in a reaction chamber;
Vaporising an amount of a polymer in the reaction chamber;
Feeding an amount of an inert gas into the reaction chamber at a predetermined rate;
Raising the temperature of the reaction chamber while decreasing the flow of the inert gas;
Maintaining the flow of inert gas at the decreased rate to form a polymer film on the nanochannel template;
Carbonising the polymer film;
wherein the polymer is a glycol based polymer.

In a further aspect the invention broadly describes a method of producing a carbon nanostructure comprising the following steps:
Placing a nanochannel template in a reaction chamber;
Vaporising an amount of a polymer in the reaction chamber;
Creating a vacuum in the reaction chamber;
Raising the temperature of the reaction chamber while maintaining the vacuum;
Maintaining the vacuum to form a polymer film on the nanochannel template;
Carbonising the polymer film;
wherein the polymer is a glycol based polymer.

The polymer may be vaporised in the reaction chamber prior to the insertion of the nanochannel template if necessary.

Preferred nanochannel templates for use in the invention include anodic aluminium oxide templates and photonic crystal templates.

Inert gases for use in the present invention are preferably selected from argon, helium, and nitrogen. The inert gas may be fed into the reaction chamber at a rate of from 500 to 800 standard cubic centimeters per minute.

When the temperature in the reaction chamber is raised, it is preferably raised to 500 degrees Celsius or higher, and up to 600 degrees Celsius if necessary.

If an inert gas is being fed into the reaction chamber, then at the time of decreasing the flow, the inert gas flow is preferably lowered to about 300 standard cubic centimeters per minute or lower.

In a particularly preferred embodiment, the glycol based polymer is an ethylene glycol based polymer. More preferably it is an ethylene glycol based block copolymer. Most preferably the glycol based polymer includes PEG and PPG units, and in a particularly preferred embodiment the polymer is a PEG-block-PPG-block-PEG copolymer.

The nanochannel template can be separated from the carbon nanostructures in a number of ways. A preferred method is by dissolving the nanochannel template (e.g. using a dilute phosphoric acid solution or a $CrO_3/H_3PO_4$ solution to dissolve an anodic aluminium oxide template. Alternatively, chemical etching can be used.

BRIEF DESCRIPTION OF THE DRAWINGS

FIG. 2(a) is an aerial-view taken from CNT arrays formed in the channels of an AAO template, while FIG. 2(b) shows CNT bundles extracted from an anodic aluminium oxide template by chemical etching.

FIG. 3(a) is a TEM image showing the open ends (as marked by the arrows) of the CNT arrays. FIG. 3(b) shows the closed ends. It is clear from this image that the CNTs walls have uniform thickness. FIG. 3(c) shows another TEM image of the CNTs, and the high-resolution TEM picture (inset) of an individual CNT. FIGS. 2(d) and 2(e) show "Y" shape CNTs formed using the methods of the invention.

FIG. 4(a) is an SEM image of silica opal with carbon filling the interspaces, while FIG. 4(b) shows carbon inverse opal structures with the silica spheres removed.

DETAILED DESCRIPTION OF THE INVENTION

The present invention describes improved methods of producing carbon nanostructures. The methods described result in the production of carbon nanostructures having uniform wall thickness. Significantly, the methods do not employ metal catalysts, and the temperatures required as not as high as those currently used. Advantages of the relatively lower temperatures required are that the separation of the templates from the carbon nanostructures is more straightforward, and the operating costs are lowered.

Preferred polymers for use in the present invention are glycol based polymers, particularly ethylene glycol based polymers. Preferred polyethylene glycol base polymers are polyethylene glycol block copolymers, with PEG-block-PPG-block-PEG polymers particularly preferred as the source of carbon for the process. Other polymers such as polyethylene or polyethylene oxide are also useful in the invention.

While anodic aluminium oxide or photonic crystal templates are useful in the invention, a skilled reader would understand that any material with the appropriate physical properties could be used. A suitable template will contain appropriately shaped nanochannels, and should be easily removable from the carbon nanostructures that are eventually formed. Anodic aluminium oxide templates are particularly preferred, as they may be removed from the formed carbon nanostructures with relative ease.

Figure 1:
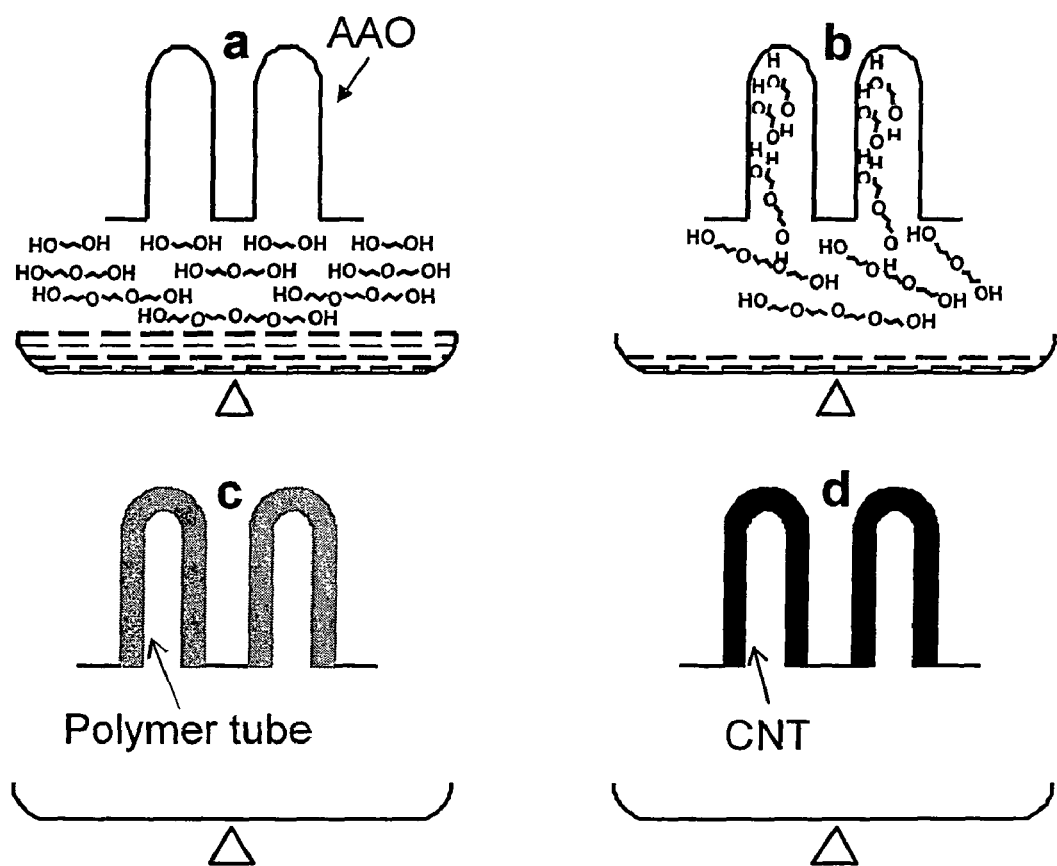
FIG. 1 is a schematic diagram showing the formation process of carbon nanostructures in the template channels.
Figure 2:
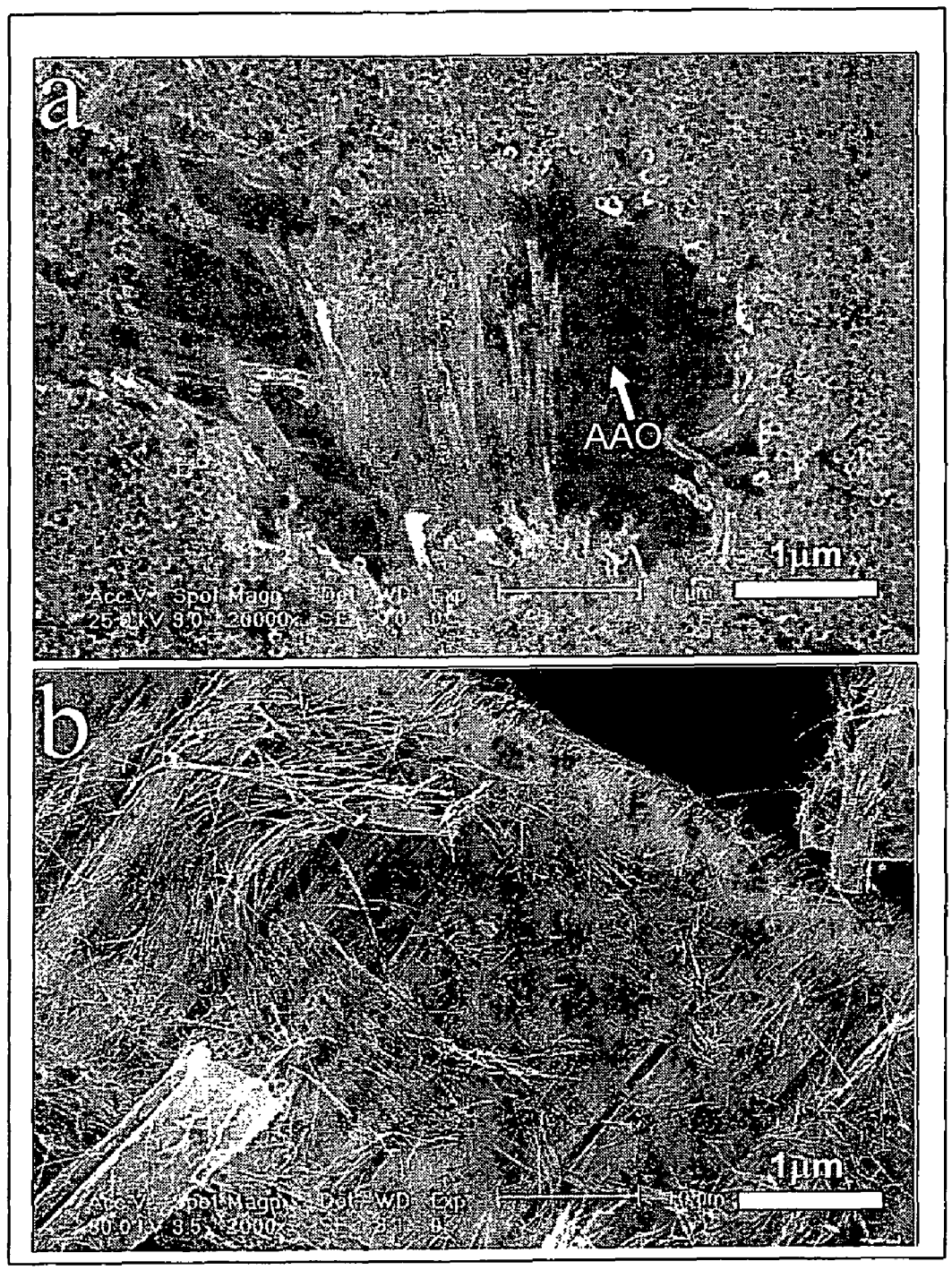
FIG. 2 shows SEM images of carbon nanotubes (CNTs) made according to the invention.

FIG. 1 is a schematic diagram showing the steps involved in the invention. In FIG. 1*a* the template's inner walls are coated with the vaporized polymer, and continued exposure leads to a more uniform cover, as shown in FIG. 1*b*. In FIG. 1*c* it can be seen that polymer tubes of uniform thickness are formed within the template, and in FIG. 1*d* the polymer tubes have been carbonized to form carbon nanostructures.

The methods described in the invention may be carried out in any suitable reaction chamber, for example a quartz reaction chamber. Other appropriate reaction chambers would be known to a person skilled in the art.

The front surface of the template is placed in the reaction chamber facing the polymer source. Then either an inert gas is fed into the reaction chamber, or a vacuum is created in the reaction chamber. The inert gas is fed into the chamber for a predetermined amount of time at a rate dependent on the amount of carbon nanostructure to be produced. Typically, the inert gas is fed into the chamber at a rate of from 500 to 800 standard cubic centimeters per minute (SCCM) for around 10 minutes, although the exact rate and exposure time will vary depending on the specific circumstances (such as the identity and amount of polymer used and the size of the template).

After the exposure to the inert gas, or alternatively, after a vacuum is created, the reaction chamber is heated to a temperature of at least 500 degrees Celsius, and up to 600 degrees Celsius. The temperature rise is gradual, with the evaporated molecules gradually depositing in the channels and forming the initial polymer layer on the template. The thickness of this polymer layer may not be uniform at this stage, since there will be more material deposited near the open ends of the channels.

Figure 5:
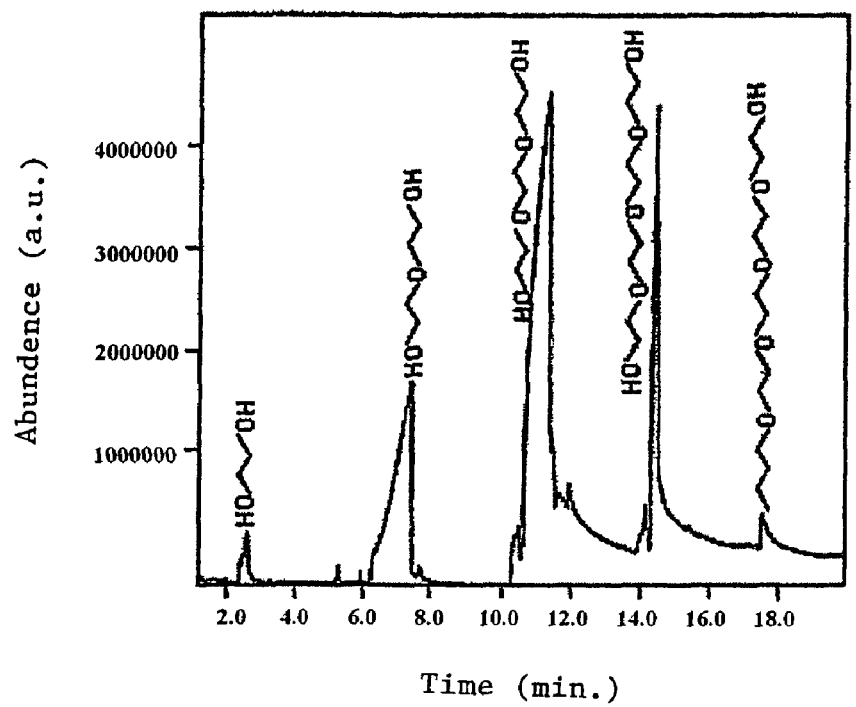
FIG. 5 shows the pyrolysis-mass spectrometry analysis of polyethylene glycol during heating. The different times correspond to temperatures from 25° C. to 350° C. Molecules, such as 1,2-ethandiol, diethylene glycol, triethylene glycol and ethanol, 2,2'-[oxygis(2,1-ethanediyloxy)]bis- were evaporated out of the polyethylene glycol respectively according to the size of the molecules. The peak from the biggest molecule 3,6,9,12-tetraoxahexadecan-1-ol appeared while the pyrolysis temperature was higher than 315 degrees Celsius.
Figure 6:
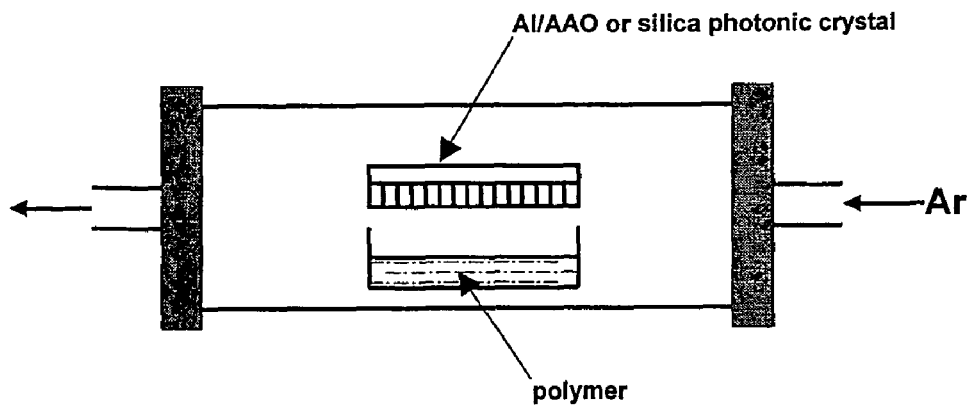
FIG. 6 illustrates the apparatus used to produce carbon nanostructures in the nanochannels of templates by chemical vapour disposition, or by carbon inverse opal using a photonic crystal template.

The evaporation continues with the smallest molecules being the first to be evaporated. Typically the whole polymer evaporation process ends at around 320° C., but this will of course be dependent on the polymer being used. Medium temperature annealing takes effect at 320-500 degrees Celsius, with annealing assisting with the polymer layer becoming more uniform. This temperature also enhances the diffusion of the polymer molecules in the template nanochannels. FIG. 5 shows the pyrolysis-mass spectrometry analysis of polyethylene glycol during heating; a similar analysis can be done to other potential carbon sources in order to calculate the temperature and time conditions required to produce carbon nanostructures.

The inert gas flow is then decreased to 300 SCCM or lower, preferably about 200 SCCM, and a as low as 100 SCCM (alternatively, if no inert gas is being fed into the reaction chamber, the vacuum is maintained). The temperature and inert gas flow (or vacuum) are maintained until the polymer has been carbonized. Typically carbonization will take about 30 minutes, during which the conditions should be maintained, although the skilled artisan would be capable of calculating the amount of time that would be required for carbonization to take place.

After carbonization, the carbon nanostructures need to be separated from the template. One method is to dissolve the template (this method is suitable for templates such as anodic aluminium oxide templates). A dilute phosphoric acid solution or a $CrO_3/H_3PO_4$ solution may be used to dissolve the anodic aluminium oxide template, leaving the carbon nanostructures intact. Chemical etching may also be used as an alternative, or in combination with the above solutions, to remove the template from the carbon nanostructures.

The resulting carbon nanostructures have uniform diameters, and depending on the template used, carbon nanostructures having diameters from 20 to 300 nm can be comfortably produced. Naturally, different templates may have different nanochannel diameters, depending on specific requirements.

Figure 3:
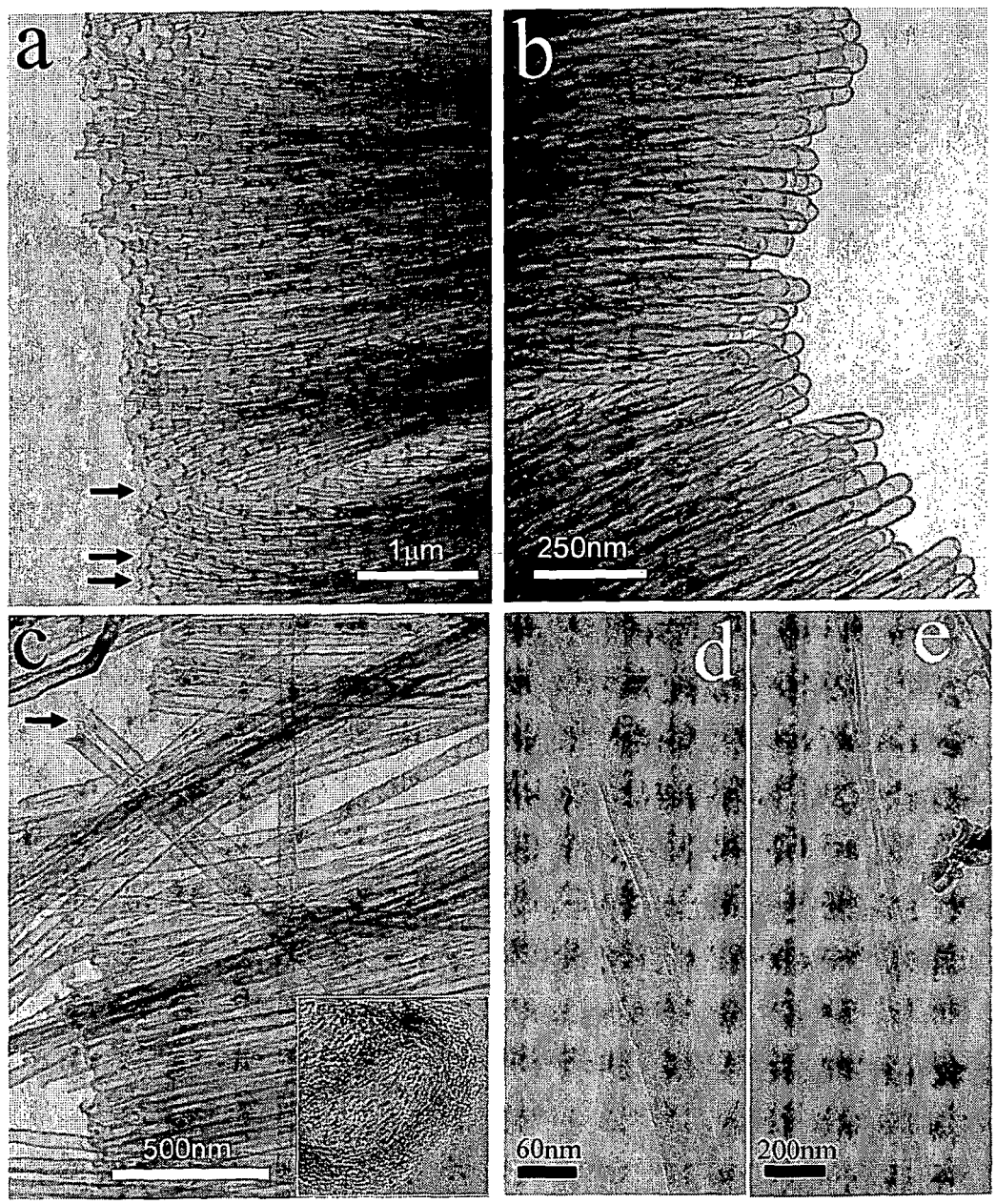
FIG. 3 shows TEM images of the CNTs.
Figure 4:
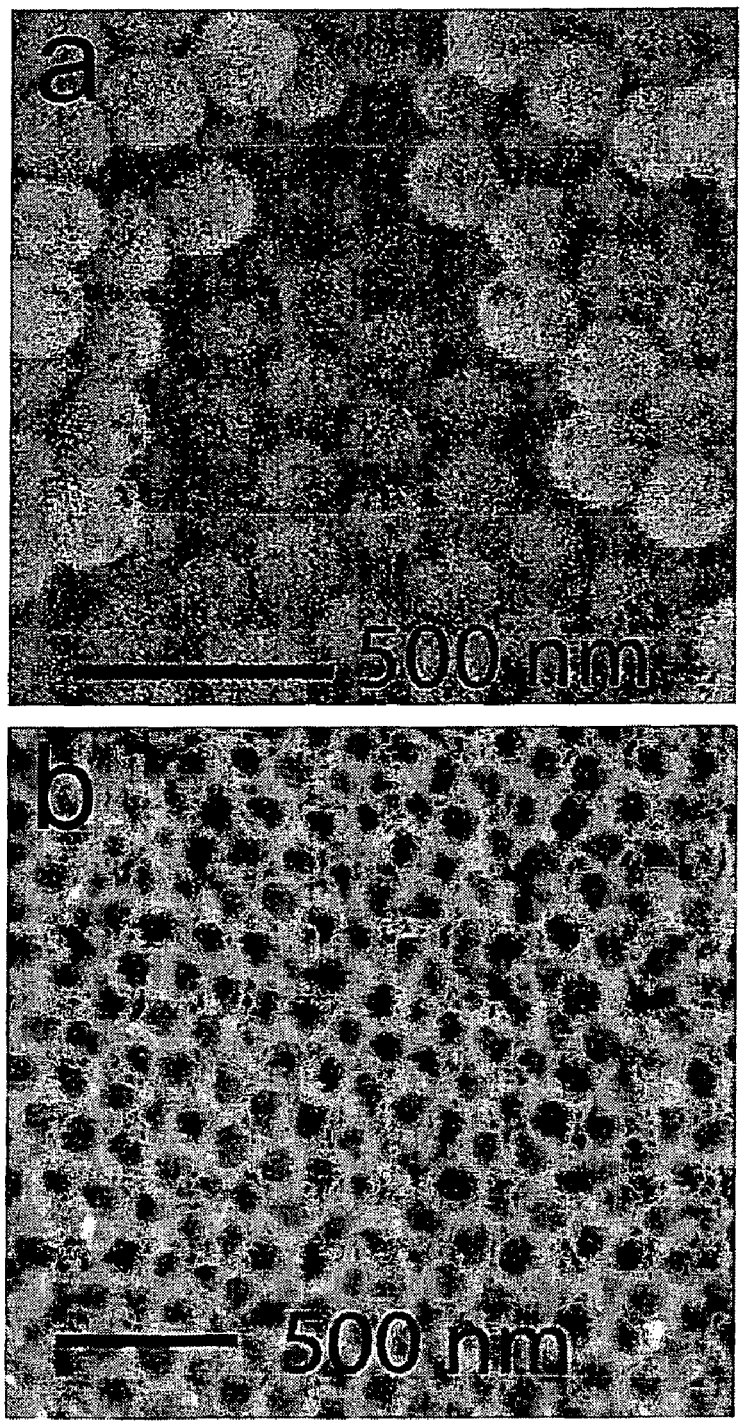
FIG. 4 shows SEM images of carbon inverse photonic crystal with or without the crystal template of silica spheres.

Using the present methods, it is also possible to produce "Y" shaped carbon nanostructures by first synthesizing 60 nm channels and then adjusting experimental conditions to those used for synthesizing 20 nm channels. FIGS. 3(*d*) and 3(*e*) show the typical "Y" shape carbon nanostructures, in which both the thick tubes (about 60 nm) and thin tubes (about 20 nm) have a similar thickness of tube walls.

At the closed ends of the template nanochannels, uniform-thickness caps of the carbon nanostructures are also formed. The blocked ends of the template nanochannels form at the final stage of anodization, at the interface between the template and the substrate. This is shown in the TEM images in FIG. 3, which were taken in a transmission electron microscope (TEM) working at 200 kV. The thickness of the tube walls at the caps is the same as at the open ends. It can be seen that uniform-thickness carbon films replicate the inside walls of the template nanochannels, regardless of whether the channels are closed at one end or open on both ends.

Other advantages of the described methods are:

There is no need for a metal catalyst. This simplifies the process, and eliminates contamination of the carbon nanostructures by metal.

The carbon nanostructures made are connected by a thin carbon film, which makes it easier to synthesise nano-electric devices.

The carbon nanostructures all have uniform thicknesses.

The process conditions are less complicated than methods known in the art.

The following examples are intended to demonstrate various embodiments of the invention. They are not intended to limit the scope of the invention, but merely provide the skilled reader with means for performing the invention, and indicate that the carbon nanostructures made according to the present invention are industrially applicable.

EXAMPLES

Example 1

Synthesis of Carbon Nanotubes

A quartz reaction chamber and an anodic aluminium oxide (AAO) template were used to synthesise carbon nanotubes. A PEG-based polymer was used as the carbon source. Evaporation of polyethylene glycol began at 160 degrees Celsius, and the evaporated molecules settled in the nanochannels of the AAO template, forming the initial polymer layer. The thickness of this polymer layer was not uniform at this stage, as more material was deposited near the open ends of the nanochannels than in the nanochannels themselves. The evaporation continued, with the smallest polymer molecules being the first to evaporate, and the largest molecule 3,6,9,12-tetraoxahexadecan-1-ol evaporated at around 315 degrees Celsius. The polymer was completely evaporated by the time the temperature of the reaction furnace reached 320 degrees Celsius.

As the reaction chamber temperature was raised from 320 to 500 degrees Celsius, annealing took place. A uniform thickness polymer layer was formed at this stage.

High-temperature carbonization for 30 minutes (at temperatures in excess of 500 degrees Celsius) of the polymer layers resulted in the formation of carbon nanotubes with uniform wall thickness along their entire length.

A $CrO_3/H_3PO_4$ solution was used to dissolve the anodic aluminium oxide template. The resulting carbon nanotubes were photographed, and can be seen in FIG. 3(a) to FIG. 3(e).

The carbon nanotubes made according to the present invention were tested in a number of environments.

Example 2

Figure 7:
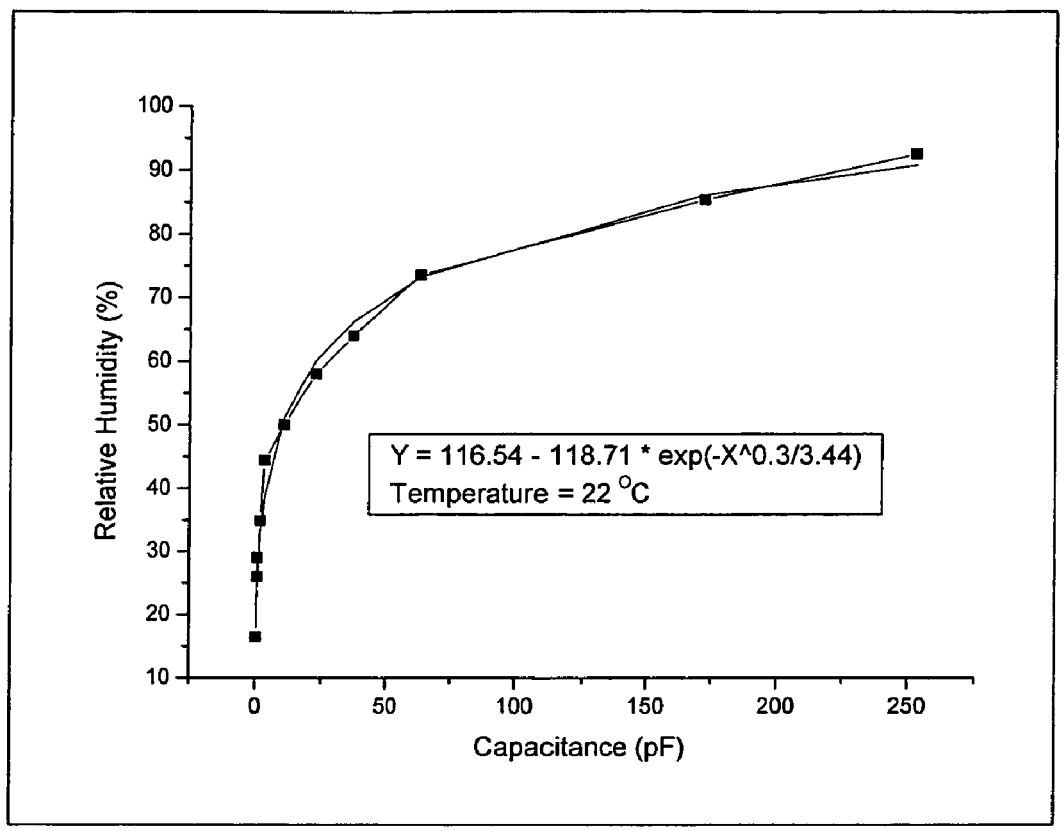
FIG. 7 exhibits the relationship of the ambient humidity and the capacitance of a carbon monoxide sensor made from a carbon nanostructure according to the present invention.

Humidity Sensors were Made from the Carbon Nanostructures:

Since the carbon nanostructures are stable below 600 degrees Celsius, they can work at higher ambient temperatures. A humidity sensor made from the CNTs is humidity sensitive, as shown by the variation of its capacitance. FIG. 7 corresponding to the formula $Y=P1+P2*\exp(-(X^0.3)/P3)$ displays the relationship between the ambient humidity (Y is the humidity in % and X is the capacitance in pF) and the capacitance of the CNTs/AAO sensor.

Example 3

CO Gas Sensors were Made from the CNT/AAO Nanostructures:

As a CO gas sensor, the CNTs/AAO shows an enhancing capacitance change while the concentration of CO increasing. A sample process gives the change of the capacitance (X) as followed, X=316 nF (in air of 21% $O_2$ and 78% $N_2$)→X=350 nF (feeding CO~10 ppm)→X=326 nF (1 min. later back in air of 21% $O_2$ and 78% $N_2$)→X=380 nF (feeding CO~14 ppm).

What is claimed is:

1. A method of producing a carbon nanostructure comprising the following steps:
    Placing a nanostructure template in a reaction chamber;
    Vaporising an amount of a PEG or a glycol based polymer that includes PEG and PPG units in the reaction chamber;
    In the absence of a metal catalyst, feeding an amount of an inert gas into the reaction chamber at a predetermined rate;
    Raising the temperature of the reaction chamber to 320 to 600° C. while decreasing the flow of the inert gas;
    Maintaining the flow of inert gas at the decreased rate to form a polymer film on the nanostructure template;
    Carbonising the polymer film at temperatures of 500 to 600° C.

2. A method of producing a carbon nanostructure comprising the following steps:
    Placing a nanostructure template in a reaction chamber;
    Vaporising an amount of a PEG or a glycol based polymer that includes PEG and PPG units in the reaction chamber;
    In the absence of a metal catalyst, creating a vacuum in the reaction chamber;
    Raising the temperature of the reaction chamber to 320 to 600° C. while maintaining the vacuum;
    Maintaining the vacuum to form a polymer film on the nanostructure template;
    Carbonising the polymer film at temperatures of 500 to 600° C.

3. A method according to either of claim 1 or 2 wherein the nanostructure template is at least one of an anodic aluminum oxide template and a photonic crystal template.

4. A method according to claim 1 wherein the inert gas is selected from argon, helium, and nitrogen.

5. A method according to claim 1 wherein the inert gas is fed into the reaction chamber at a rate of from 500 to 800 Standard Cubic Centimeters per minute.

6. A method according to claim 1 or claim 2 wherein the temperature is raised to 500 degrees Celsius or higher.

7. A method according to claim 1 wherein the inert gas flow is lowered to 300 Standard Cubic Centimeters per minute or lower.

8. A method according to claim 1 or claim 2 further comprising the step of separating the carbon nanostructures from the nanostructure template.

9. A method according to claim 8 wherein the nanostructure template is separated from the carbon nanostructure by at least one of dissolving the nanostructure template and chemical etching.

10. A method according to claim 9 wherein the nanostructure template is dissolved using a dilute phosphoric acid solution or a $CrO_3/H_3PO_4$ solution.

* * * * *